US010455472B2

(12) United States Patent
Wu

(10) Patent No.: US 10,455,472 B2
(45) Date of Patent: Oct. 22, 2019

(54) DEVICE AND METHOD OF HANDLING DATA TRANSMISSIONS IN A WIRELESS COMMUNICATION SYSTEM

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/839,829

(22) Filed: Dec. 12, 2017

(65) Prior Publication Data
US 2018/0167859 A1 Jun. 14, 2018

Related U.S. Application Data

(60) Provisional application No. 62/433,740, filed on Dec. 13, 2016.

(51) Int. Cl.
| H04B 7/00 | (2006.01) |
| H04W 36/22 | (2009.01) |
| H04W 76/19 | (2018.01) |
| H04W 76/12 | (2018.01) |
| H04W 84/12 | (2009.01) |

(52) U.S. Cl.
CPC ............ *H04W 36/22* (2013.01); *H04W 76/12* (2018.02); *H04W 76/19* (2018.02); *H04W 84/12* (2013.01)

(58) Field of Classification Search
CPC ......... H04W 36/0005; H04W 36/0055; H04W 36/14; H04W 36/34
USPC .......................... 370/310, 328, 331, 437, 465
See application file for complete search history.

(56) References Cited

U.S. PATENT DOCUMENTS

| 10,021,617 | B2* | 7/2018 | Kim | H04W 36/28 |
| 10,149,344 | B2* | 12/2018 | Wu | H04W 52/0216 |
| 10,172,027 | B2* | 1/2019 | Wu | H04W 76/16 |
| 2017/0094700 | A1* | 3/2017 | Hong | H04W 76/12 |
| 2017/0094701 | A1* | 3/2017 | Hong | H04L 63/0272 |
| 2017/0135147 | A1* | 5/2017 | Belghoul | H04W 76/36 |
| 2017/0303155 | A1* | 10/2017 | Kim | H04W 24/10 |

(Continued)

OTHER PUBLICATIONS

3GPP TS 36.323 V14.0.1, Sep. 2016.

*Primary Examiner* — Dmitry Levitan
(74) *Attorney, Agent, or Firm* — Winston Hsu

(57) ABSTRACT

A first communication device for communicating with a second communication device according to a Cellular network/wireless local area network (WLAN) Radio Level Integration with Internet Protocol Security (IPsec) Tunnel (CWIP) comprises a storage device for storing instructions and a processing circuit coupled to the storage device. The processing circuit is configured to execute the instructions stored in the storage device. The instructions comprise performing a CWIP configuration and a CWIP aggregation configuration; transmitting a plurality of CWIP Encapsulation Protocol (CWIPEP) protocol data units (PDUs) over a radio bearer (RB) via a cellular connection or a WLAN to the second communication device, in response to the CWIP configuration and the CWIP aggregation configuration; performing a radio resource control (RRC) connection reestablishment or a handover; and stopping transmitting any CWIPEP PDU over the RB to the second communication device, after completing the RRC connection reestablishment or the handover.

3 Claims, 9 Drawing Sheets

(56) References Cited

U.S. PATENT DOCUMENTS

2017/0338937 A1* 11/2017 Laselva ................ H04W 12/02
2017/0353919 A1* 12/2017 Derham .............. H04L 61/6081
2018/0019970 A1*  1/2018 Wu ...................... H04L 63/029
2018/0262465 A1*  9/2018 Maattanen ............ H04W 12/02

* cited by examiner

DEVICE AND METHOD OF HANDLING DATA TRANSMISSIONS IN A WIRELESS COMMUNICATION SYSTEM

CROSS REFERENCE TO RELATED APPLICATIONS

This application claims the benefit of U.S. Provisional Application No. 62/433,740, filed on Dec. 13, 2016, which is incorporated herein by reference.

BACKGROUND OF THE INVENTION

1. Field of the Invention

The present invention relates to a device and a method used in a wireless communication system, and more particularly, to a device and a method of handling data transmissions in a wireless communication system.

2. Description of the Prior Art

A long-term evolution (LTE) system provides high data rate, low latency, packet optimization, and improved system capacity and improved coverage. In the LTE system, a radio access network known as an evolved universal terrestrial radio access network (E-UTRAN) includes at least one evolved Node-B (eNB) for communicating with at least one user equipment (UE), and for communicating with a core network. The core network may include a mobility management (MME), a serving gateway, a packet data network (PDN) gateway, an Evolved Packet Data Gateway (ePDG), etc.

The LTE system may be aggregated with a wireless local area network (WLAN) to improve the throughput of the LTE system or to offload traffic to the WLAN from the LTE system.

SUMMARY OF THE INVENTION

The present invention therefore provides a communication device and method for handling data transmissions in a wireless communication system to solve the abovementioned problem.

A first communication device for communicating with a second communication device according to a Cellular network/wireless local area network (WLAN) Radio Level Integration with Internet Protocol Security (IPsec) Tunnel (CWIP) comprises a storage device for storing instructions and a processing circuit coupled to the storage device. The processing circuit is configured to execute the instructions stored in the storage device. The instructions comprise performing a CWIP configuration and a CWIP aggregation configuration; transmitting a plurality of CWIP Encapsulation Protocol (CWIPEP) protocol data units (PDUs) over a radio bearer (RB) via a cellular connection or a WLAN to the second communication device, in response to the CWIP configuration and the CWIP aggregation configuration; performing a radio resource control (RRC) connection reestablishment or a handover; and stopping transmitting any CWIPEP PDU over the RB to the second communication device, after completing the RRC connection reestablishment or the handover.

A first communication device for communicating with a second communication device according to a CWIP comprises a storage device for storing instructions and a processing circuit coupled to the storage device. The processing circuit is configured to execute the instructions stored in the storage device. The instructions comprise transmitting a plurality of packet data convergence protocol (PDCP) service data units (SDUs) over a RB to the second communication device; performing a PDCP reestablishment; transmitting a PDCP SDU associated to the RB to the second communication device in response to the PDCP reestablishment, when the RB is not configured for a CWIP aggregation, wherein the PDCP SDU is not transmitted successfully before the first communication device performs the PDCP reestablishment; and not transmitting the PDCP SDU associated to the RB to the second communication device in response to the PDCP reestablishment, when the RB is configured for the CWIP aggregation.

A first base station (BS) in a network for communicating with a communication device according to a CWIP comprises a storage device for storing instructions and a processing circuit coupled to the storage device. The processing circuit is configured to execute the instructions stored in the storage device. The instructions comprise transmitting a CWIP configuration and a CWIP aggregation configuration to the communication device; transmitting a plurality of CWIPEP PDUs over a radio bearer (RB) via a cellular connection or a WLAN to the communication device, in response to the transmission of the CWIP configuration and the CWIP aggregation configuration; transmitting a Handover Request message to a second BS, to request the second BS to prepare a handover for the communication device; receiving a Handover Request Acknowledge message from the second BS, wherein the Handover Request Acknowledge message comprises a Handover Command message indicating the communication device to perform the handover to a cell of the second BS; transmitting the Handover Command message to the communication device; and forwarding an IP packet associated to the RB to the second BS in response to the handover, wherein the IP packet is comprised in a CWIPEP PDU and the CWIPEP PDU is not transmitted successfully to the communication device before the first communication device performs the handover.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
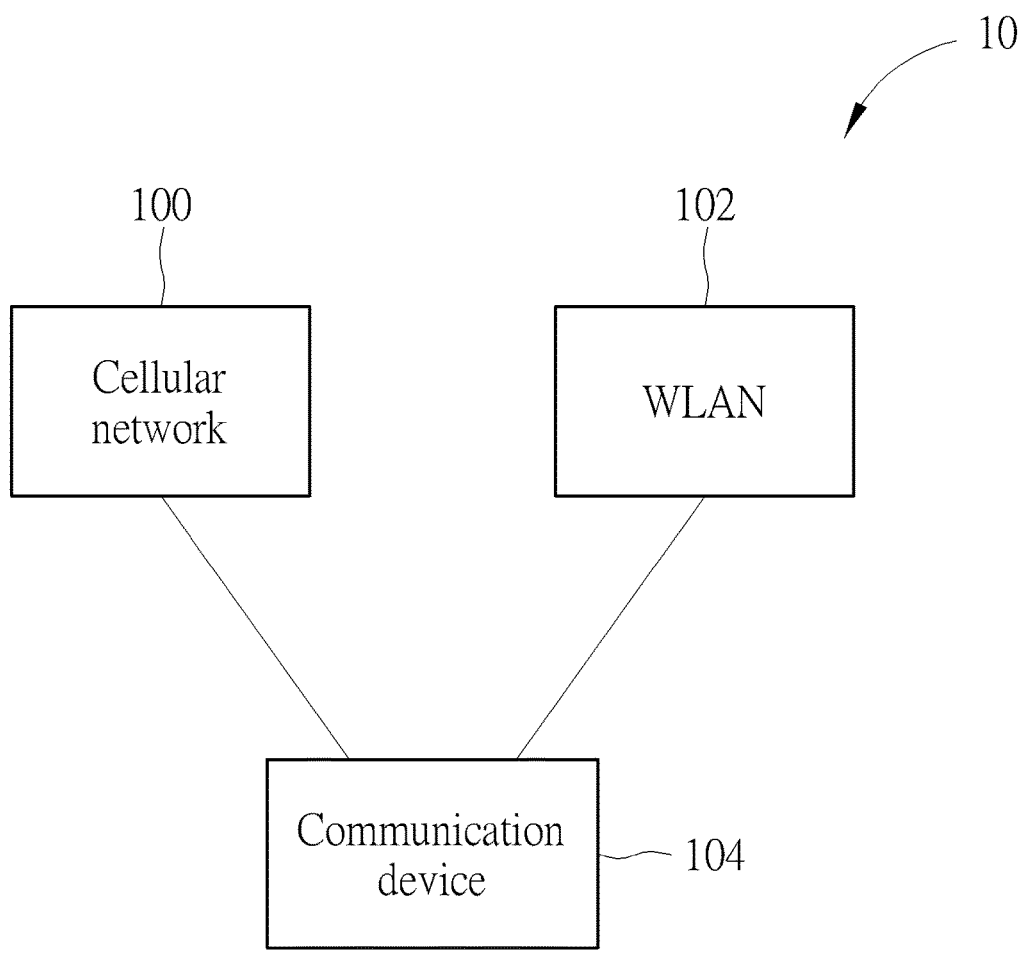
FIG. 1 is a schematic diagram of a wireless communication system according to an example of the present invention.

FIG. 1 is a schematic diagram of a wireless communication system 10 according to an example of the present invention. The wireless communication system 10 is briefly composed of a cellular network 100, a wireless local area network (WLAN) 102 and a communication device 104. Practically, the cellular network 100 may be an evolved universal terrestrial radio access network (E-UTRAN) comprising at least one evolved NB (eNB) and/or at least one relay. In another example, the cellular network 100 may be a fifth generation (5G) network including at least one 5G eNB (e.g., gNB) which employs orthogonal frequency-division multiplexing (OFDM) and/or non-OFDM, and a transmission time interval (TTI) for communicating with the communication devices is smaller than 1 millisecond (ms). In general, a base station (BS) is used to refer any of the eNB and the 5G eNB. In one example, a WLAN standard operated by the WLAN may include IEEE 802.11ac, 802.11n, 802.11g, 802.11b and 802.11a. The WLAN may operate in 2.4 GHz or 5 GHz band, but is not limited herein.

The communication device 104 can be a user equipment (UE), a mobile phone, a laptop, a tablet computer, an electronic book, a portable computer system, a vehicle or aircraft. In addition, the cellular network 100 (or the WLAN 102) and the communication device 104 can be seen as a transmitter or a receiver according to direction (i.e., transmission direction), e.g., for an uplink (UL), the communication device 104 is the transmitter and the cellular network 100 (or the WLAN 102) is the receiver, and for a downlink (DL), the cellular network 100 (or the WLAN 102) is the transmitter and the communication device 104 is the receiver.

Figure 2:
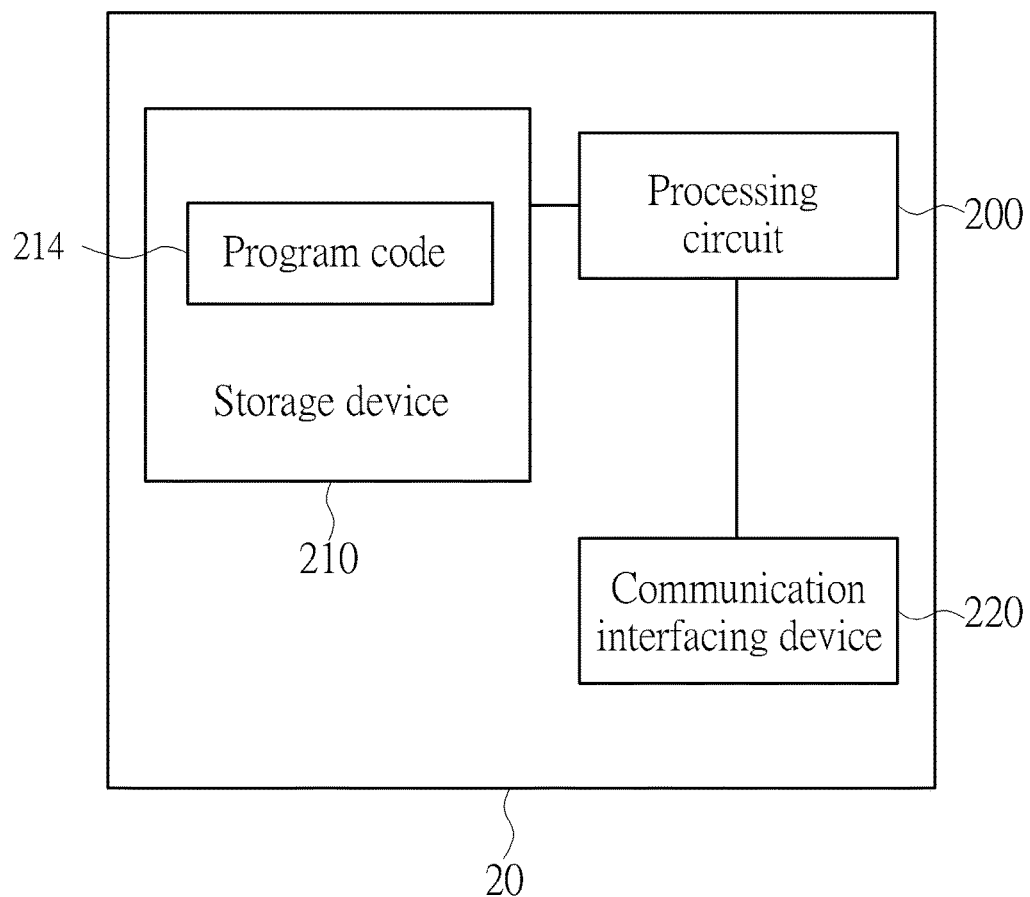
FIG. 2 is a schematic diagram of a communication device according to an example of the present invention.

FIG. 2 is a schematic diagram of a communication device 20 according to an example of the present invention. The communication device 20 may be the communication device 104, the cellular network 100 or the WLAN 102 shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes a transceiver and is used to transmit and receive signals (e.g., data, signals, messages and/or packets) according to processing results of the processing circuit 200.

In the following examples, a UE or a communication device is used interchangeably to represent the communication device 104 in FIG. 1, to simplify the illustration of the embodiments.

When receiving a handover command triggering a handover, initiating a radio resource control (RRC) connection reestablishment procedure or receiving a RRCConnection-Reconfiguration message after a successful completion of the RRC connection reestablishment procedure, the UE performs a packet data convergence protocol (PDCP) reestablishment. The UE, for a data radio bearer (DRB) configured to use a LTE WLAN Radio Level Integration with IPsec Tunnel (LWIP) aggregation, transmits a PDCP service data unit (SDU) (i.e., a LWIP Encapsulation Protocol (LWIPEP) protocol data unit (PDU)) associated with a PDCP sequence number (SN) over the DRB to a BS after the PDCP reestablishment, the handover, the RRC connection reestablishment procedure or the RRCConnectionReconfiguration message. However, the BS does not know that the received PDCP SDU is the LWIPEP PDU, because the BS to which the UE is handed over or the UE initiates the RRC connection reestablishment does not have a LWIP configuration.

Similarly, the BS, for the DRB configured to use the LWIP aggregation, transmits the PDCP SDU (i.e., the LWIPEP PDU) associated with the PDCP SN over the DRB to the UE after the PDCP reestablishment, the handover, the RRC connection reestablishment procedure or the RRCConnectionReconfiguration message. The UE does not know that the received PDCP SDU is the LWIPEP PDU, because the UE does not have the LWIP configuration.

A Cellular network/WLAN Radio Level Integration with Internet Protocol Security (IPsec) Tunnel (CWIP) supports an aggregation of data received from a cellular network transmission and a WLAN transmission in an IP layer. That is, the BS communicates (e.g., transmits or receives) data via the cellular communication and the WLAN communication with (e.g., to or from) the UE. The BS may or may not be collocated with the WLAN. An example of an overall architecture for CWIP is LTE/WLAN Radio Level Integration with IPsec Tunnel (LWIP). In some of the following embodiments, "LWIP" is used for "CWIP" to simplify the illustration. In other words, "LWIP" of the embodiments does not limit the scope of the invention to "LWIP" only. Such LWIP embodiments might also cover CWIP scenarios.

A RRCConnectionReconfiguration message transmitted by the BS provides a LWIP configuration including necessary parameters for the UE, to initiate an establishment of a LWIP tunnel (including an IPsec tunnel) for a DRB. When the LWIP tunnel is established, the DRB can be configured to use LWIP resources. A DRB configuration on the LTE access corresponding to the DRB using the LWIP resources shall not be released. The DRB is maintained on the LTE.

A single IPSec tunnel is used per UE for all the DRBs that are configured to transmit and/or receive data over the WLAN. Each DRB may be configured so that traffic for the DRB can be routed over the IPsec tunnel or the LTE in either only the DL or both the UL and the DL over the WLAN. Signalling radio bearers (SRBs) are carried over the LTE only. The BS configures specific DRB(s) to use the IPsec tunnel.

For the DL of a DRB, the UE may receive packets from the IPsec tunnel or the LTE from the BS. For the UL, the BS configures the UE to route UL packets either via the LTE or via the WLAN according to a RRC signaling. If the UL packets are routed via the WLAN, all UL traffic of the DRB is offloaded to the WLAN. In one example, the UL packets of the DRB sent over the LWIP tunnel are encapsulated into LWIPEP PDUs according to a LWIPEP with a "Key" field in a LWIPEP header populated with a DRB Identity associated with an offloaded UL bearer.

If an aggregation over the LWIP (called a LWIP aggregation) is enabled in the UL or the DL, the corresponding (e.g., the UL or the DL) packets sent over the LWIP tunnel and the LTE are encapsulated into LWIPEP PDUs according to the LWIPEP. The LWIPEP layer assigns SNs to all packets and populates a "SN" field in a LWIPEP header according to the SNs. The "Key" field in the LWIPEP header is populated with the DRB Identity of the associated DRB.

When a LWIPEP PDU is transmitted over the LTE, the LWIPEP PDU is transmitted in a PDCP. That is, the LWIPEP PDU is a PDCP SDU included in a PDCP Data PDU.

Upon a handover or a RRC connection reestablishment procedure, the UE autonomously releases a LWIP configuration and stops communicating (e.g., transmitting and receiving) LWIPEP PDUs over the DRB(s) via the LWIP tunnel and via the LTE.

Figure 3:
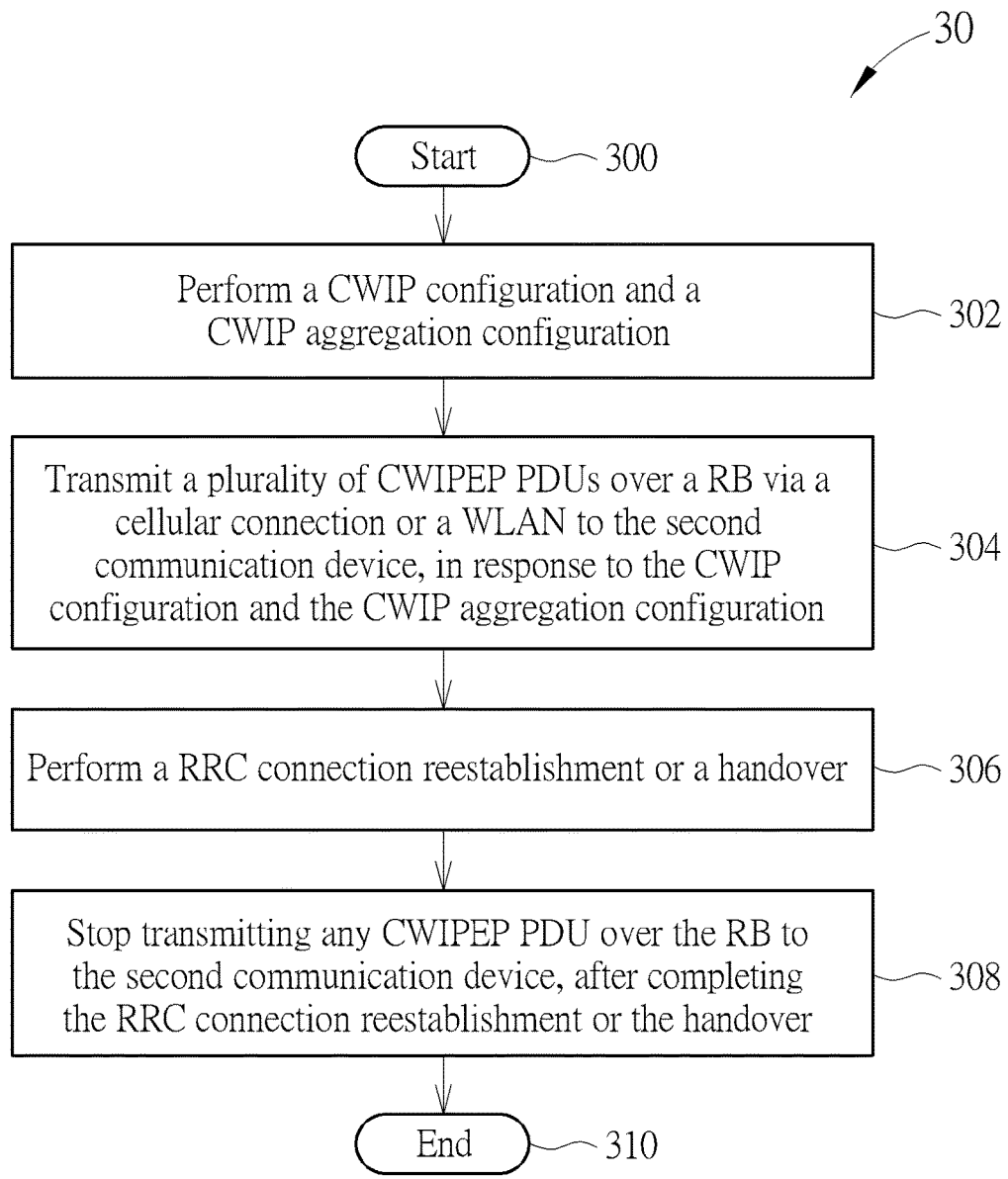
FIG. 3 is a flowchart of a process according to an example of the present invention.

FIG. 3 is a flowchart of a process 30 according to an example of the present invention. The process 30 is utilized in a first communication device (e.g., the UE 104 or a BS in the cellular network 100), to communicate with a second communication device (e.g., the BS in the cellular network 100 or the UE 104) according to a CWIP. The process 30 includes the following steps:

Step 300: Start.

Step 302: Perform a CWIP configuration and a CWIP aggregation configuration.

Step 304: Transmit a plurality of CWIP Encapsulation Protocol (CWIPEP) PDUs over a radio bearer (RB) via a cellular connection or a WLAN to the second communication device, in response to the CWIP configuration and the CWIP aggregation configuration.

Step 306: Perform a RRC connection reestablishment or a handover.

Step 308: Stop transmitting any CWIPEP PDU over the RB to the second communication device, after completing the RRC connection reestablishment or the handover.

Step 310: End.

Realization of the process 30 is not limited to the above description. The following examples may be applied to the process 30.

In one example, the first communication device is a UE and the second communication device is a BS, or the first communication device is the BS and the second communication device is the UE.

In one example, each of the plurality of CWIPEP PDUs comprises an IP packet. In one example, the first communication device releases the CWIP configuration and the CWIP aggregation configuration in response to the RRC connection reestablishment or the handover.

In one example, the first communication device performs a PDCP reestablishment, in response to the RRC connection reestablishment, the handover or a RRC reconfiguration procedure after the RRC connection reestablishment. Because the first communication device stops transmitting any CWIPEP PDU over the RB after completing the RRC connection reestablishment or the handover, the first communication device does not transmit a PDCP SDU (i.e., a CWIP PDU) associated to the RB in response to the PDCP reestablishment when the RB is not configured for performing a transmission according to a CWIP aggregation, wherein the PDCP SDU is not transmitted successfully before the first communication device performs the PDCP reestablishment (or due to the PDCP reestablishment).

In one example, the first communication device does not encapsulate a plurality of IP packets into a plurality of CWIPEP packets and does not transmit the plurality of CWIPEP packets as a plurality of PDCP SDUs in a plurality of PDCP PDUs over the RB. Instead, the first communication device transmits the plurality of IP packets directly as the plurality of PDCP SDUs in the plurality of PDCP PDUs over the RB, after performing the handover, the RRC connection reestablishment or the RRC reconfiguration procedure.

In one example, the BS transmits the CWIP configuration and the CWIP aggregation configuration in a same RRC message or different RRC messages to the UE. In one example, the UE (e.g., the first communication device) performs the CWIP configuration and the CWIP aggregation configuration, when receiving the CWIP configuration and the CWIP aggregation configuration with the BS (e.g., the second communication device). In one example, the BS (e.g., the first communication device) performs the CWIP configuration and the CWIP aggregation configuration, when transmitting the CWIP configuration and the CWIP aggregation configuration to the UE (e.g., the second communication device).

Figure 4:
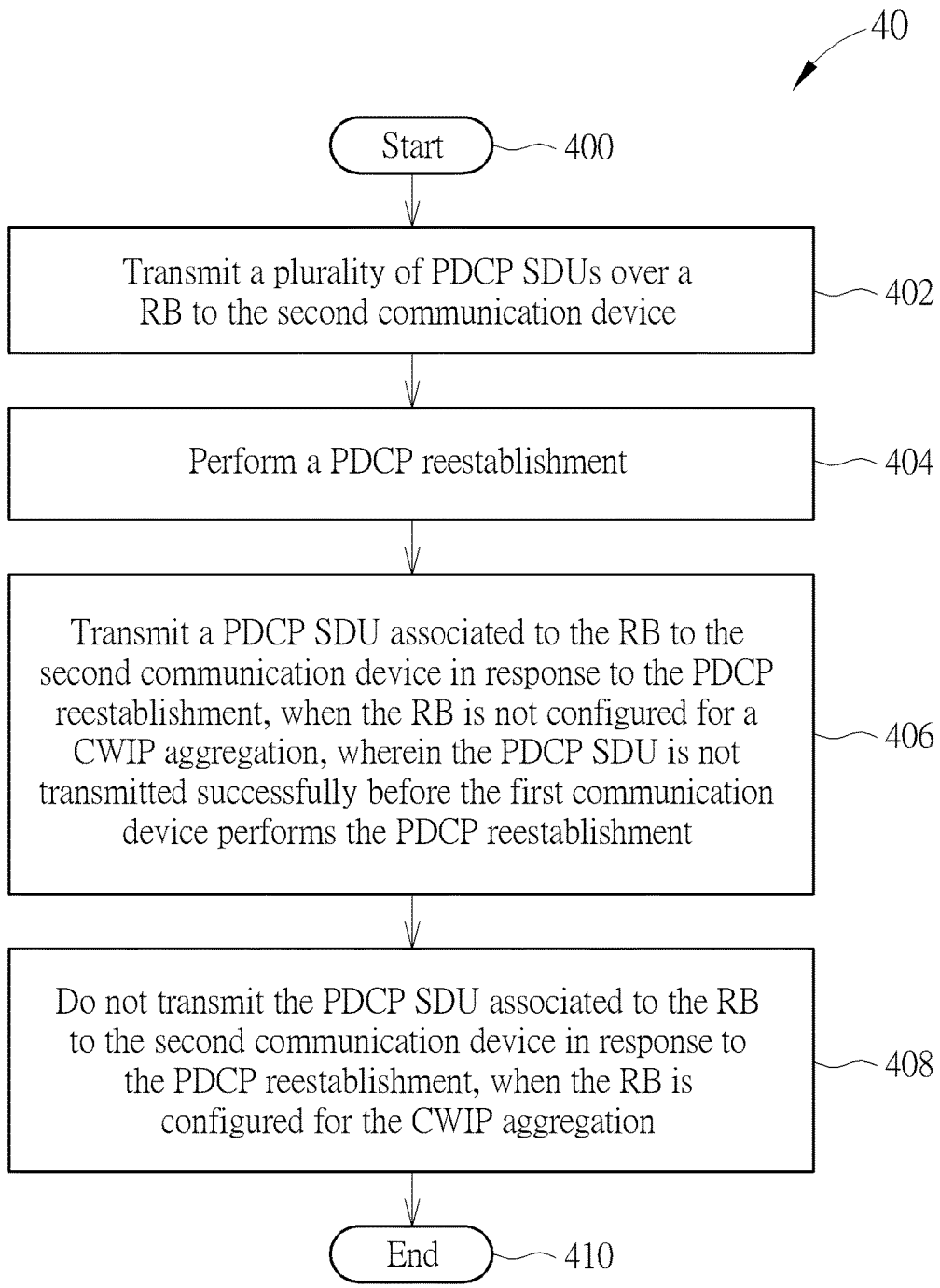
FIG. 4 is a flowchart of a process according to an example of the present invention.

FIG. 4 is a flowchart of a process 40 according to an example of the present invention. The process 40 is utilized in a first communication device (e.g., the UE 104 or a BS in the cellular network 100), to communicate with a second communication device (e.g., the BS in the cellular network 100 or the UE 104) according to a CWIP. The process 40 includes the following steps:

Step 400: Start.

Step 402: Transmit a plurality of PDCP SDUs over a RB to the second communication device.

Step 404: Perform a PDCP reestablishment.

Step 406: Transmit a PDCP SDU associated to the RB to the second communication device in response to the PDCP reestablishment, when the RB is not configured for a CWIP aggregation, wherein the PDCP SDU is not transmitted successfully before the first communication device performs the PDCP reestablishment.

Step 408: Do not transmit the PDCP SDU associated to the RB to the second communication device in response to the PDCP reestablishment, when the RB is configured for the CWIP aggregation.

Step 410: End.

Realization of the process 40 is not limited to the above description. The following examples may be applied to the process 40.

In one example, the first communication device does not encapsulate a plurality of IP packets into a plurality of CWIPEP packets and does not transmit the plurality of CWIPEP packets as a plurality of PDCP SDUs in a plurality of PDCP PDUs over the RB after performing the PDCP reestablishment, when the RB is configured for a CWIP aggregation. Instead, the first communication device transmits the plurality of IP packets directly as the plurality of PDCP SDUs in the plurality of PDCP PDUs over the RB after performing the PDCP reestablishment, when the RB is configured for the CWIP aggregation. In one example, the first communication device transmits an IP packet in a PDCP PDU associated to the RB, after performing the PDCP reestablishment, wherein the IP packet is comprised in a CWIPEP PDU and the CWIPEP PDU is not transmitted successfully before the first communication device performs the PDCP reestablishment.

Figure 5:
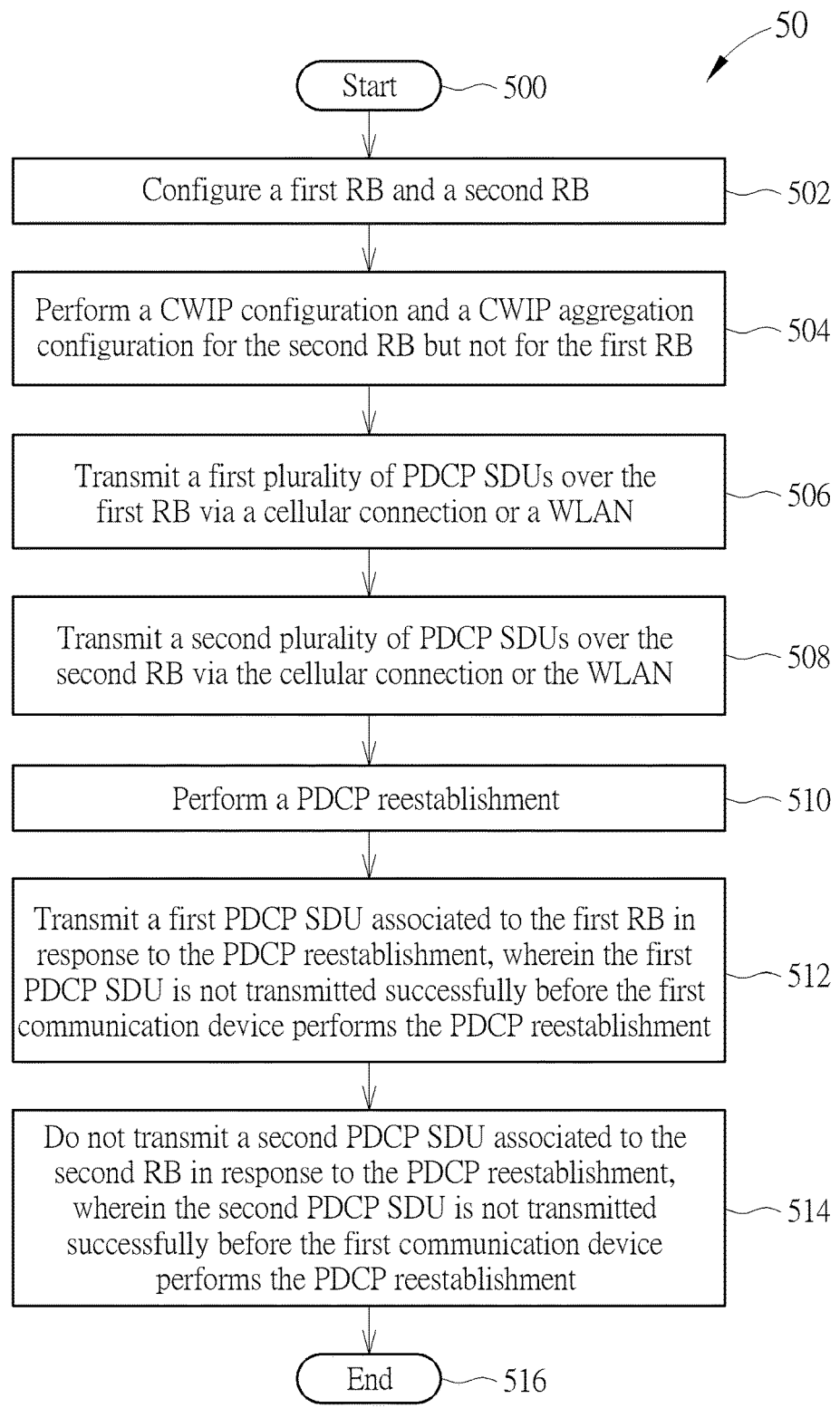
FIG. 5 is a flowchart of a process according to an example of the present invention.

FIG. 5 is a flowchart of a process 50 according to an example of the present invention. The process 50 is utilized in a first communication device (e.g., the UE 104 or a BS in the cellular network 100), to communicate with a second communication device (e.g., the BS in the cellular network 100 or the UE 104) according to a CWIP. The process 50 includes the following steps:

Step 500: Start.

Step 502: Configure a first RB and a second RB.

Step 504: Perform a CWIP configuration and a CWIP aggregation configuration for the second RB but not for the first RB.

Step 506: Transmit a first plurality of PDCP SDUs over the first RB via a cellular connection or a WLAN.

Step 508: Transmit a second plurality of PDCP SDUs over the second RB via the cellular connection or the WLAN.

Step 510: Perform a PDCP reestablishment.

Step 512: Transmit a first PDCP SDU associated to the first RB in response to the PDCP reestablishment, wherein the first PDCP SDU is not transmitted successfully before the first communication device performs the PDCP reestablishment.

Step 514: Do not transmit a second PDCP SDU associated to the second RB in response to the PDCP reestablishment, wherein the second PDCP SDU is not transmitted successfully before the first communication device performs the PDCP reestablishment.

Step 516: End.

Realization of the process 50 is not limited to the above description. The following examples may be applied to the process 50.

In one example, the first communication device does not encapsulate a plurality of IP packets into a plurality of CWIPEP packets and does not transmit the plurality of CWIPEP packets as a plurality of PDCP SDUs in a plurality of PDCP PDUs over the second RB. Instead, the first communication device transmits the plurality of IP packets directly as the plurality of PDCP SDUs in the plurality of PDCP PDUs over the second RB. The first communication device may transmit an IP packet in a PDCP PDU associated to the second RB in response to the PDCP reestablishment, wherein the IP packet is included in a CWIPEP PDU (i.e., a PDCP SDU) and the CWIPEP PDU is not transmitted successfully before the first communication device performs the PDCP reestablishment.

Figure 6:
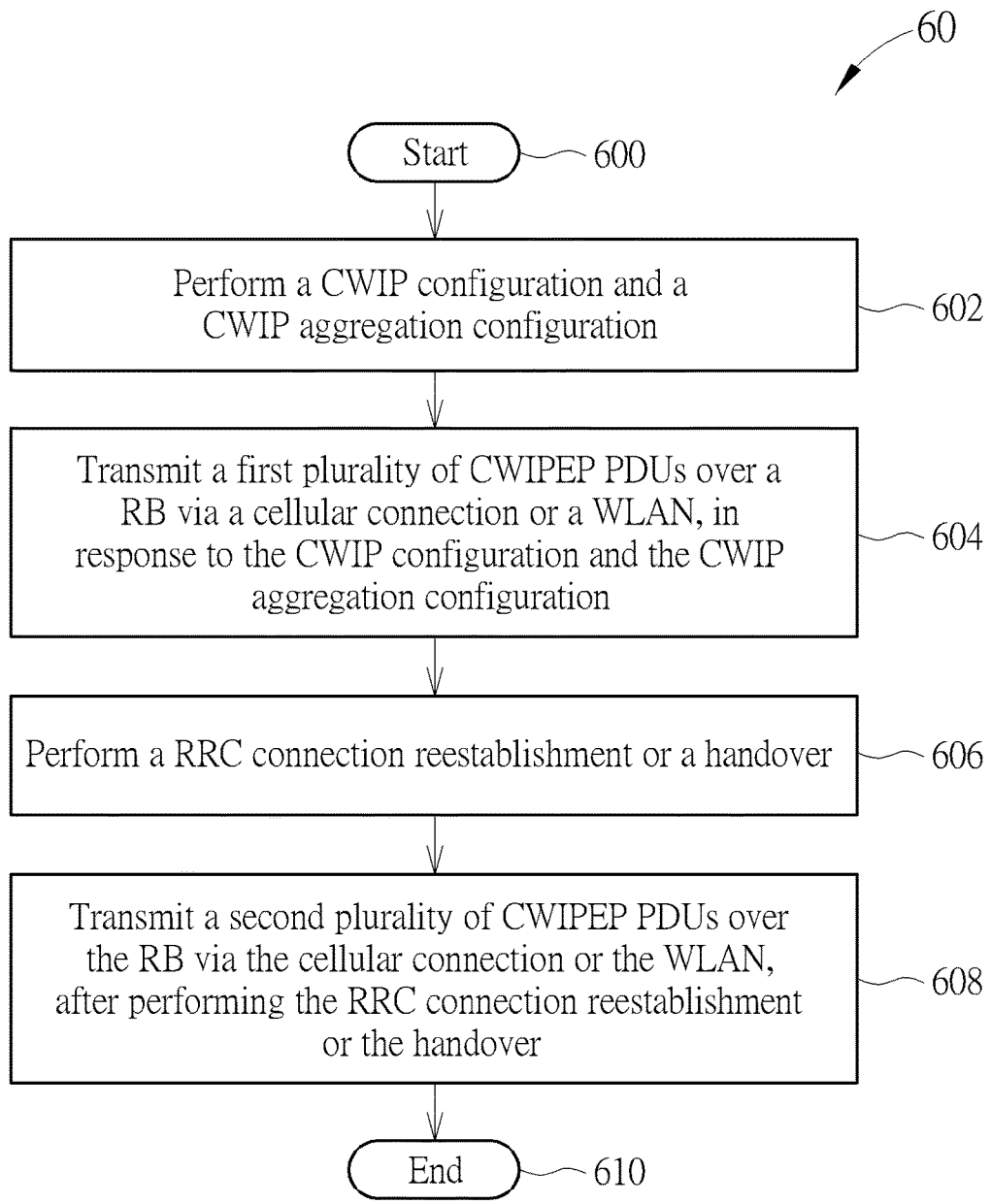
FIG. 6 is a flowchart of a process according to an example of the present invention.

FIG. 6 is a flowchart of a process 60 according to an example of the present invention. The process 60 is utilized in a first communication device (e.g., the UE 104 or a BS in the cellular network 100), to communicate with a second communication device (e.g., the BS in the cellular network 100 or the UE 104) according to a CWIP. The process 60 includes the following steps:

Step 600: Start.

Step 602: Perform a CWIP configuration and a CWIP aggregation configuration.

Step 604: Transmit a first plurality of CWIPEP PDUs over a RB via a cellular connection or a WLAN, in response to the CWIP configuration and the CWIP aggregation configuration.

Step 606: Perform a RRC connection reestablishment or a handover.

Step 608: Transmit a second plurality of CWIPEP PDUs over the RB via the cellular connection or the WLAN, after performing the RRC connection reestablishment or the handover.

Step 610: End.

Realization of the process 60 is not limited to the above description. The following examples may be applied to the process 60.

In one example, the first communication device transmits a CWIPEP PDU in a PDCP PDU associated to the RB, after completing the RRC connection reestablishment or the handover, wherein the CWIPEP PDU is not transmitted successfully to the second communication device.

In one example, the first communication device releases the CWIP configuration and the CWIP aggregation configuration in response to the RRC connection reestablishment or the handover. In one example, the first communication device keeps the CWIP configuration and the CWIP aggregation configuration in response to the RRC connection reestablishment or the handover.

In one example, the first communication device releases the CWIP configuration and the CWIP aggregation configuration, when a handover command of the handover indicates a release of the CWIP configuration and the CWIP aggregation configuration. In one example, the first communication device keeps the CWIP configuration and the CWIP aggregation configuration, when the handover command of the handover does not indicate the release of the CWIP configuration and the CWIP aggregation configuration.

Figure 7:
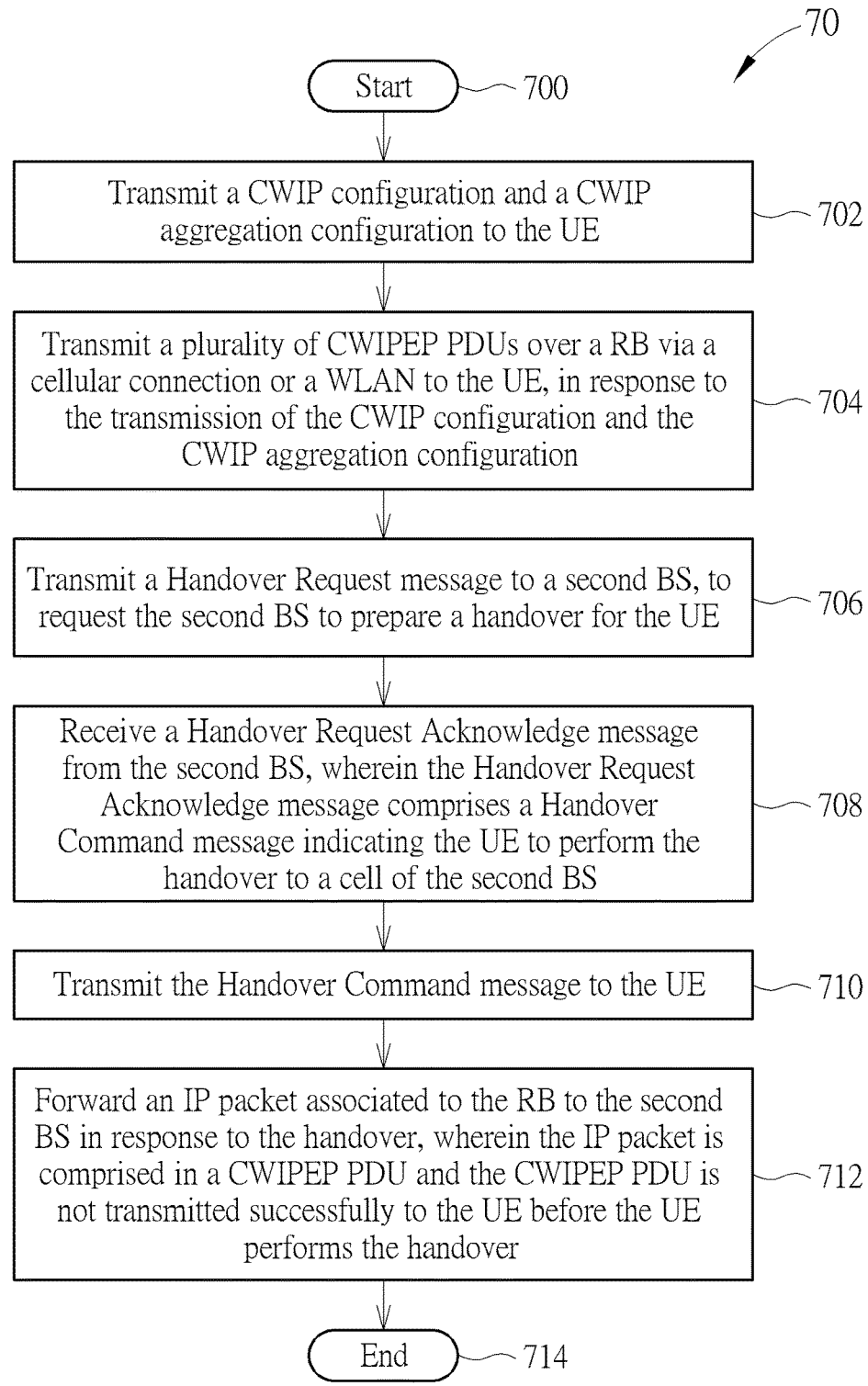
FIG. 7 is a flowchart of a process according to an example of the present invention.

FIG. 7 is a flowchart of a process 70 according to an example of the present invention. The process 70 is utilized in a first BS in a network (e.g., the cellular network 100), to communicate with a UE (e.g., the UE 104) according to a CWIP. The process 70 includes the following steps:

Step 700: Start.

Step 702: Transmit a CWIP configuration and a CWIP aggregation configuration to the UE.

Step 704: Transmit a plurality of CWIPEP PDUs over a RB via a cellular connection or a WLAN to the UE, in response to the transmission of the CWIP configuration and the CWIP aggregation configuration.

Step 706: Transmit a Handover Request message to a second BS, to request the second BS to prepare a handover for the UE.

Step 708: Receive a Handover Request Acknowledge message from the second BS, wherein the Handover Request Acknowledge message comprises a Handover Command message indicating the UE to perform the handover to a cell of the second BS.

Step 710: Transmit the Handover Command message to the UE.

Step 712: Forward an IP packet associated to the RB to the second BS in response to the handover, wherein the IP packet is comprised in a CWIPEP PDU and the CWIPEP PDU is not transmitted successfully to the UE before the UE performs the handover.

Step 714: End.

Realization of the process 70 is not limited to the above description. The following examples may be applied to the process 70.

In one example, the first BS does not forward the CWIPEP PDU (i.e., a PDCP SDU) associated to the RB to the second BS in response to the handover, wherein the CWIPEP PDU is not transmitted successfully to the UE.

In one example, the first BS forwards the IP packet and a PDCP SN associated to the IP packet to the second BS instead of the CWIPEP PDU.

Figure 8:
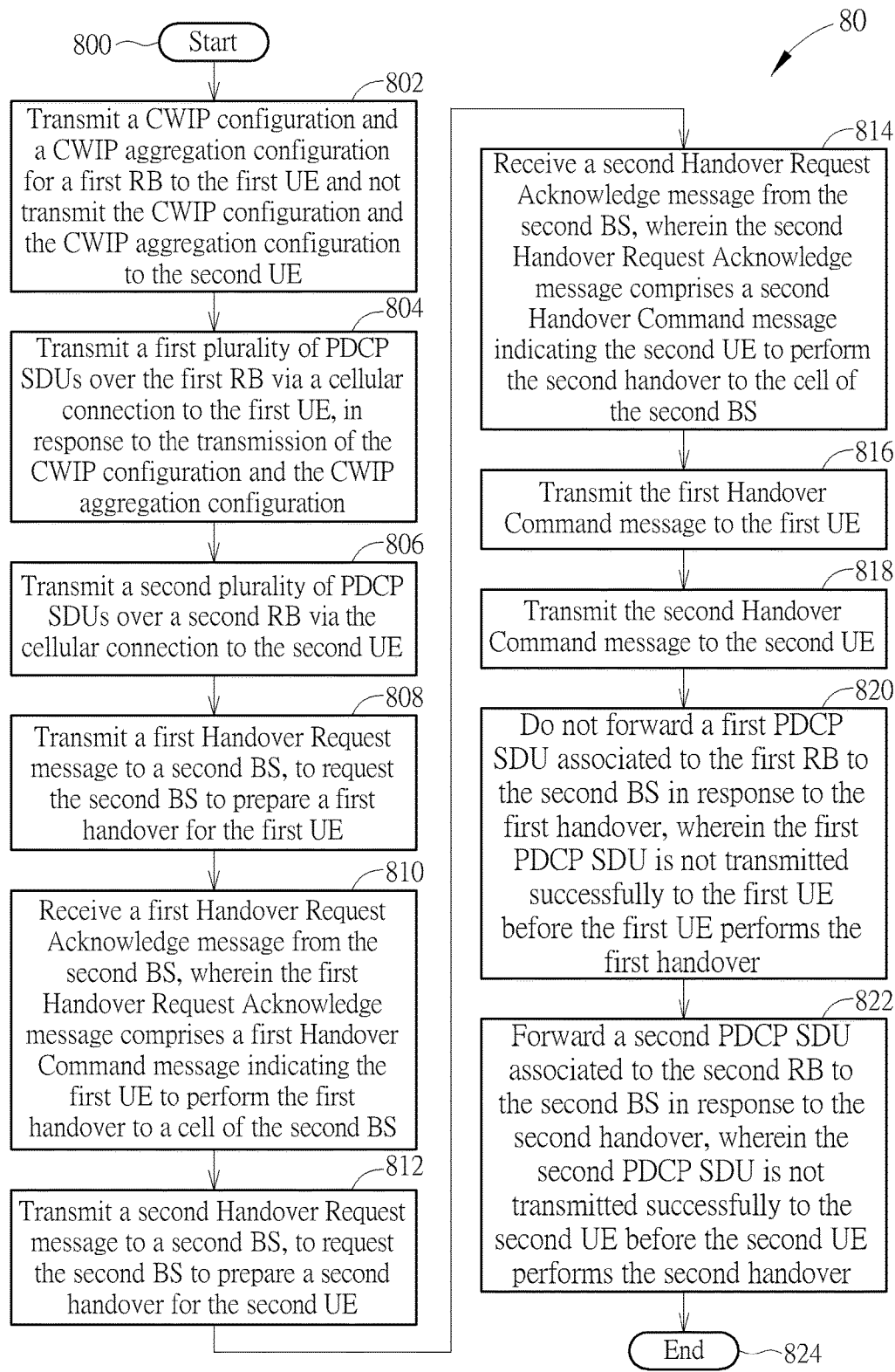
FIG. 8 is a flowchart of a process according to an example of the present invention.

FIG. 8 is a flowchart of a process 80 according to an example of the present invention. The process 80 is utilized in a first BS in a network (e.g., the cellular network 100), to communicate with a first UE and a second UE according to a CWIP. The process 80 includes the following steps:

Step 800: Start.

Step 802: Transmit a CWIP configuration and a CWIP aggregation configuration for a first RB to the first UE and not transmit the CWIP configuration and the CWIP aggregation configuration to the second UE.

Step 804: Transmit a first plurality of PDCP SDUs over the first RB via a cellular connection to the first UE, in response to the transmission of the CWIP configuration and the CWIP aggregation configuration.

Step 806: Transmit a second plurality of PDCP SDUs over a second RB via the cellular connection to the second UE.

Step 808: Transmit a first Handover Request message to a second BS, to request the second BS to prepare a first handover for the first UE.

Step 810: Receive a first Handover Request Acknowledge message from the second BS, wherein the first Handover Request Acknowledge message comprises a first Handover Command message indicating the first UE to perform the first handover to a cell of the second BS.

Step 812: Transmit a second Handover Request message to a second BS, to request the second BS to prepare a second handover for the second UE.

Step 814: Receive a second Handover Request Acknowledge message from the second BS, wherein the second Handover Request Acknowledge message comprises a second Handover Command message indicating the second UE to perform the second handover to the cell of the second BS.

Step 816: Transmit the first Handover Command message to the first UE.

Step 818: Transmit the second Handover Command message to the second UE.

Step 820: Do not forward a first PDCP SDU associated to the first RB to the second BS in response to the first handover, wherein the first PDCP SDU is not transmitted successfully to the first UE before the first UE performs the first handover.

Step 822: Forward a second PDCP SDU associated to the second RB to the second BS in response to the second handover, wherein the second PDCP SDU is not transmitted successfully to the second UE before the second UE performs the second handover.

Step 824: End.

Realization of the process 80 is not limited to the above description. The following examples may be applied to the process 80.

In one example, the first BS forwards the second PDCP SDU and a PDCP SN associated to the second PDCP SDU to the second BS.

In one example, the first PDCP SDU associated to the first RB is a CWIPEP PDU. The second PDCP SDU associated to the second RB is an IP packet. In one example, the first BS transmits a plurality of CWIPEP PDUs over the WLAN to the first UE.

In one example, the first BS forwards an IP packet associated to the first RB to the second BS in response to the first handover, wherein the IP packet is included in a CWIPEP PDU and the CWIPEP PDU is not transmitted successfully to the first UE before the first UE performs the handover (or due to the handover).

In one example, the first handover and the second handover are a same handover, if the first UE and the second UE are a same UE.

Figure 9:
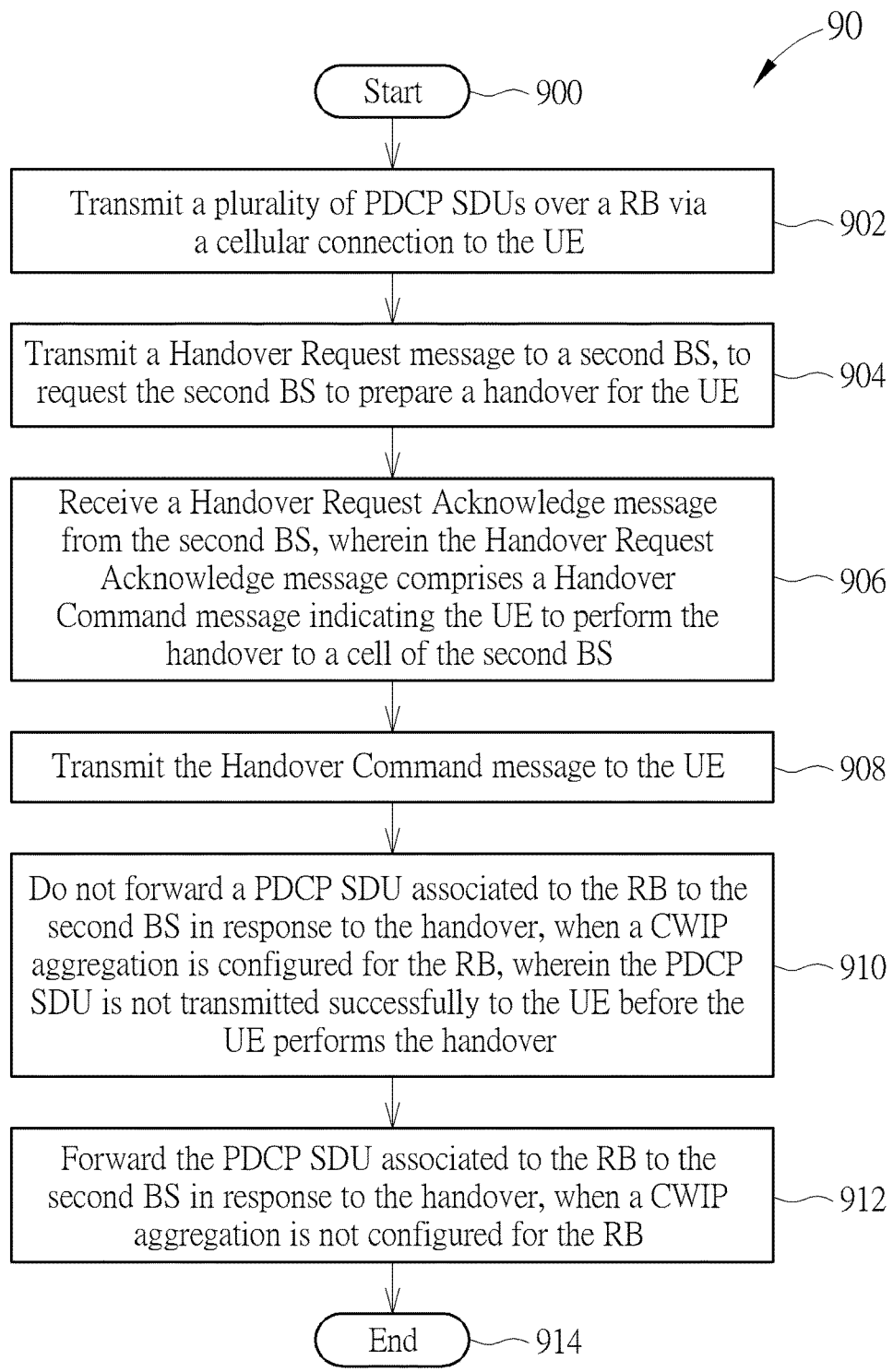
FIG. 9 is a flowchart of a process according to an example of the present invention.

FIG. 9 is a flowchart of a process 90 according to an example of the present invention. The process 90 is utilized in a first BS in a network (e.g., the cellular network 100), to communicate with a UE (e.g., the UE 104) according to a CWIP. The process 90 includes the following steps:

Step 900: Start.

Step 902: Transmit a plurality of PDCP SDUs over a RB via a cellular connection to the UE.

Step 904: Transmit a Handover Request message to a second BS, to request the second BS to prepare a handover for the UE.

Step 906: Receive a Handover Request Acknowledge message from the second BS, wherein the Handover Request Acknowledge message comprises a Handover Command message indicating the UE to perform the handover to a cell of the second BS.

Step 908: Transmit the Handover Command message to the UE.

Step 910: Do not forward a PDCP SDU associated to the RB to the second BS in response to the handover, when a CWIP aggregation is configured for the RB, wherein the PDCP SDU is not transmitted successfully to the UE before the UE performs the handover.

Step 912: Forward the PDCP SDU associated to the RB to the second BS in response to the handover, when a CWIP aggregation is not configured for the RB.

Step 914: End.

Realization of the processes 30-90 is not limited to the above description. The following examples may be applied to the processes 30-90.

In one example, the first communication device is a UE and the second communication device is a BS, or the first communication device is the BS and the second communication device is the UE.

In one example, when the PDCP SDU is transmitted, the PDCP SDU is included in a PDCP PDU and the PDCP PDU is transmitted by the UE or the BS.

In one example, there are at least two cases that the PDCP SDU is not transmitted successfully before the first communication device performs a PDCP reestablishment, the handover or a RRC connection reestablishment (or due to the PDCP reestablishment, the handover or the RRC connection reestablishment). In one case, a corresponding PDCP PDU has not previously been submitted to a lower layer of a PDCP of the first communication device. In the other case, the successful delivery of the corresponding PDCP PDU has not been confirmed by the lower layer. The PDCP SDU may be a CWIPEP PDU or an IP packet, and the CWIPEP PDU may include an IP packet. The corresponding PDCP PDU may include the PDCP SDU, a compressed and/or encrypted version of the PDCP SDU and/or a robust header compression (ROHC) compressed version of the PDCP SDU, and the first communication device may transmit the corresponding PDCP PDU to the second communication device. The PDCP SDU may have already been associated with a PDCP SN.

In one example, when the CWIP aggregation is configured, the first communication device associates a PDCP SN to an IP packet instead of associating the PDCP SN to a CWIPEP PDU including the IP packet. In one example, when the CWIP aggregation is configured, the first communication device associates the PDCP SN to the IP packet and the CWIPEP PDU including the IP packet. Thus, when the first communication device does not use the CWIPEP PDU, the first communication device still knows a sequence of the IP packet with the PDCN SN.

In one example, the UE has a cellular connection with the cellular network, before the cellular network configures the CWIP aggregation to the UE. The cellular connection may be a LTE connection or a 5G connection (e.g., a radio link, a RRC connection, a signaling radio bearer or a data radio bearer, etc.). The cellular network may transmit a CWIP configuration and a CWIP aggregation configuration to the UE. The CWIP configuration may be a LWIP configuration (e.g., lwip-Configuration) or a 5G/WLAN Radio Level Integration with IPsec Tunnel (5GWIP). The CWIP aggregation configuration may indicate a DL aggregation, an UL aggregation or a both DL and UL aggregation. The CWIP aggregation may be a LWIP aggregation or a 5GWIP aggregation. In one example, in the CWIP aggregation, the UE or the BS (e.g., the first communication device) transmits a plurality of CWIPEP PDUs via both the cellular connection and the WLAN to the BS or the UE (e.g., the second communication device).

In one example, each CWIPEP PDU of the plurality of CWIPEP PDUs includes a header and an IP packet. The header of the CWIPEP PDU includes a bearer identity (e.g., a RB identity or an EPS bearer identity) and a SN. The bearer identity indicates a RB to which the IP packet is associated. In one example, when the UE or the BS (e.g., the first communication device) receives a CWIPEP PDU, the UE or the BS identifies the RB to which the IP packet belongs according to the RB identity and reorders the CWIPEP PDU or the IP packet according to the SN. The header may be a generic routing encapsulation (GRE) header as specified in RFC 2890. The 5 LSB's of a "Key" field in the GRE header to the RB identity are associated with the IP packet and set the remaining MSB's to "0". The RB is a DRB, and the bearer identity is a DRB identity.

In one example, the LWIP configuration includes a LWIP tunnel configuration (i.e., TunnelConfigLWIP) and a WLAN mobility configuration (i.e., WLAN-MobilityConfig). In one example, the LWIP tunnel configuration configures a first IP address (of a first security gateway), an Internet Key Exchange (IKE) identity and a counter value used by the UE to establish an IPsec tunnel for the LWIP. In one example, when the UE successfully establishes the IPsec tunnel according to the first IP address, the first IKE identity and a first counter, the UE starts transmitting a LWIPEP PDU by a PDCP, i.e., the UE generates a PDCP PDU including the LWIPEP PDU (i.e., the PDCP SDU). That is, when the IPsec tunnel for the LWIP is established, the LWIP tunnel is established.

In one example, the UE receives a third IP address from the cellular network via the cellular communication (e.g., the LTE/5G communication), before receiving the CWIP configuration. The UE establishes a first IPsec tunnel over the WLAN connection to the first IP address by using a second IP address according to a first Internet Key Exchange Protocol Version 2 (IKEv2) handshake procedure, when having the cellular connection. The UE receives the second IP address from the WLAN (e.g., the second IP address is assigned by a dynamic host configuration protocol (DHCP) server to the UE) and performs a communication on the WLAN according to the second IP address. The UE generates a first IP packet and sets a first source IP address in a first IP header of the first IP packet to the third IP address. The UE transmits the first IP packet over the first IPsec tunnel, while having the cellular connection to use the LWIP.

In one example of transmitting the first IP packet over the first IPsec tunnel, the UE encapsulates the first IP packet into a second IP packet. The UE sets a second source IP address in a second IP header of the second IP packet to the second IP address, and a destination IP address in the second IP header of the second IP packet is the first IP address. The second IP header may include an authentication header (AH) or an encapsulating security payload (ESP). The UE establishes a second IPsec tunnel over the WLAN connection to the second IP address by using the second IP address according to a second IKEv2 handshake procedure, when having the cellular connection.

Examples of any of the above processes may be applied to another process, and not narrated herein. The processes 30-90 may be combined and modified.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling data transmissions in a wireless communication system. A first communication device determines whether to transmit a PDCP SDU associated to a RB to a second communication device or not according to the RB. Thus, the problem of the data transmissions can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first base station (BS) in a network for communicating with a communication device according to a Cellular network/wireless local area network (WLAN) Radio Level Integration with Internet Protocol Security (IPsec) Tunnel (CWIP), comprising:
 a storage device, for storing instructions; and
 a processing circuit, coupled to the storage device, wherein the processing circuit is configured to execute the instructions of:
 transmitting a CWIP configuration and a CWIP aggregation configuration to the communication device;
 transmitting a plurality of CWIP Encapsulation Protocol (CWIPEP) protocol data units (PDUs) over a radio bearer (RB) via a cellular connection or a WLAN to the communication device, after transmitting the CWIP configuration and the CWIP aggregation configuration;
 transmitting a Handover Request message to a second BS, to request the second BS to prepare a handover for the communication device;
 receiving a Handover Request Acknowledge message from the second BS, wherein the Handover Request Acknowledge message comprises a Handover Command message indicating the communication device to perform the handover to a cell of the second BS;
 transmitting the Handover Command message to the communication device; and
 forwarding an IP packet associated to the RB to the second BS in response to the handover, wherein the IP packet is comprised in a CWIPEP PDU and the CWIPEP PDU is not transmitted successfully to the communication device before the communication device performs the handover.

2. The first BS of claim 1, wherein the storage device further stores the instruction of:
 not forwarding the CWIPEP PDU associated to the RB to the second BS in response to the handover, wherein the CWIPEP PDU is not transmitted successfully to the communication device.

3. The first BS of claim 1, wherein the storage device further stores the instruction of:

forwarding the IP packet and a packet data convergence protocol (PDCP) sequence number (SN) associated to the IP packet to the second BS instead of the CWIPEP PDU.

\* \* \* \* \*